United States Patent
Howard

(10) Patent No.: US 10,339,433 B2
(45) Date of Patent: Jul. 2, 2019

(54) INTEGRATED POWER SOURCE ON A PAYMENT DEVICE

(71) Applicant: VISA INTERNATIONAL SERVICE ASSOCIATION, San Francisco, CA (US)

(72) Inventor: Kelvan Howard, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 181 days.

(21) Appl. No.: 14/932,670

(22) Filed: Nov. 4, 2015

(65) Prior Publication Data
US 2017/0124445 A1 May 4, 2017

(51) Int. Cl.
| | | |
|---|---|---|
| *G06K 19/07* | (2006.01) | |
| *G06F 1/26* | (2006.01) | |
| *G06K 19/04* | (2006.01) | |
| *G06Q 20/40* | (2012.01) | |
| *G06F 1/16* | (2006.01) | |
| *G06K 19/077* | (2006.01) | |
| *G07F 7/08* | (2006.01) | |

(52) U.S. Cl.
CPC ........ *G06K 19/0711* (2013.01); *G06F 1/1635* (2013.01); *G06F 1/1694* (2013.01); *G06F 1/26* (2013.01); *G06F 1/263* (2013.01); *G06K 19/042* (2013.01); *G06K 19/0715* (2013.01); *G06K 19/07707* (2013.01); *G06K 19/07709* (2013.01); *G06Q 20/405* (2013.01); *G06Q 20/40145* (2013.01); *G07F 7/0833* (2013.01); *G07F 7/0866* (2013.01)

(58) Field of Classification Search
CPC ..... G06K 19/0711; G06K 19/042; G06F 1/26
USPC .......................................................... 310/339
See application file for complete search history.

(56) References Cited

U.S. PATENT DOCUMENTS

| | | | |
|---|---|---|---|
| 3,233,465 A | 2/1966 | Tolliver | |
| 6,764,005 B2 * | 7/2004 | Cooper | G06K 19/06 235/449 |
| 2003/0001459 A1 * | 1/2003 | Scott | G06K 9/0002 310/339 |

(Continued)

FOREIGN PATENT DOCUMENTS

| | | |
|---|---|---|
| WO | 2009148418 A1 | 12/2009 |
| WO | 2013160011 A1 | 10/2013 |

OTHER PUBLICATIONS

Jordan Mulcare, "The industry's first thin full-functional tri-axis accelerometers", Kionix Inc., Mar. 12, 2015, Retrieved at http://www.electronicspecifier.com/sensors/the-industrys-first-thin-full-functional-tri-axis-accelerometers; Mar. 13, 2015, 4 pages.

(Continued)

*Primary Examiner* — Bryan P Gordon
(74) *Attorney, Agent, or Firm* — Loeb & Loeb LLP

(57) ABSTRACT

The described payment device includes an integrated power source including a piezoelectric accelerometer. Upon motion of the payment device, kinetic energy may be translated to a mass of the piezoelectric accelerometer to generate electrical energy to power other functions of the payment device. Motion translated to the piezoelectric accelerometer may also be used in combination with other inputs to implement security functions of the payment device.

17 Claims, 2 Drawing Sheets

(56) References Cited

U.S. PATENT DOCUMENTS

| | | |
|---|---|---|
| 2005/0194452 A1 | 9/2005 | Nordentoft |
| 2006/0124756 A1* | 6/2006 | Brown ............. G06K 19/06206 |
| | | 235/492 |
| 2009/0240625 A1* | 9/2009 | Faith ....................... H02J 7/025 |
| | | 705/65 |
| 2010/0270889 A1* | 10/2010 | Xu .......................... G01P 15/09 |
| | | 310/329 |
| 2010/0320274 A1 | 12/2010 | Nielsen |
| 2013/0185201 A1* | 7/2013 | Jain ..................... G06Q 20/341 |
| | | 705/41 |
| 2013/0217152 A1 | 8/2013 | Mullen |
| 2013/0299592 A1* | 11/2013 | Chiang ............ G06K 19/07309 |
| | | 235/492 |
| 2014/0061317 A1* | 3/2014 | Lust .................... G06O 20/341 |
| | | 235/492 |
| 2014/0144984 A1 | 5/2014 | Olson |

OTHER PUBLICATIONS

PCT International Preliminary Report on Patentability for PCT/US2016/060394, dated May 8, 2018 (7 pages).

\* cited by examiner

INTEGRATED POWER SOURCE ON A PAYMENT DEVICE

FIELD OF TECHNOLOGY

The present disclosure relates to a credit card configured to include a power source for a variety of applications and, more particularly, a credit card configured to include an accelerometer, such as a piezoelectric accelerometer, as a power source to enhance security and facilitate payment functions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Credit card transactions have long been the target of criminal fraud. In a digital purchase transaction, a physical credit card is not used and, thus, stolen information alone may be used by the criminal to complete a fraudulent transaction. In a point-of-sale transaction using the physical card, criminals must employ sophisticated techniques to duplicate the physical card using stolen credit card holder information. Credit card companies have gone to great lengths to insure physical cards cannot be copied by incorporating security measures into each physical card. However, advances in small-scale production of these measures have made it increasingly easier for criminals to duplicate even advanced measures for physical credit card security.

Too, there are numerous different measures credit card issuers might employ to deter or prevent physical credit card fraud. However, cost and size limitations make such measures impractical for a wallet-sized credit card. Increasingly, there is a need for smaller, more sophisticated measures to ensure physical credit card security.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A credit card may be configured to employ an integrated energy source (e.g., an accelerometer), within the card in order to provide power for sophisticated physical security components. In some embodiments, the accelerometer may be a piezoelectric accelerometer. For example, motion of the card such as carrying the card while walking, raising the card, or moving the card around or pressure on the card or on an area of the accelerometer in particular allows generation of electrical energy to power a sensor or other physical security features of the card. Incorporation of a user input or biometric sensor with the integrated energy source may allow the card to be "unlocked" temporarily (e.g., for a specified time period such as 15 seconds). Additionally, the integrated power source might power input of a user ID (e.g., pin code, motion pattern) or a biometric sensor allowing the card to be unlocked so that it only works temporarily. In some embodiments, the card may be unlocked for a specified time period while the card is energized and after the user ID or biometric has been input. An integrated energy source such as a piezoelectric accelerometer may eliminate the need for an on-board battery and allow a card to work without requiring power from the point-of-sale device. These measures would increase security by allowing a card to work only while it is energized and unlocked by a user while increasing the range of use to more mobile applications that might involve payment without a traditional point of sale device. Still further, a card configured as described would allow for on-card token generation as well as on-card displays of information as well as on-card generation of dynamic authorization data without requiring an on-card battery.

In one embodiment, a payment device may include an integrated power source including a piezoelectric accelerometer, a processor in communication with the integrated power source, and a memory in communication with the processor, the memory storing instructions that are executable by the processor; and an input/output circuit in communication with the processor. Kinetic energy and/or pressure translated to the payment device and, thus, to the piezoelectric material may generate electrical energy to power the processor, memory, and input/output circuit.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1A:
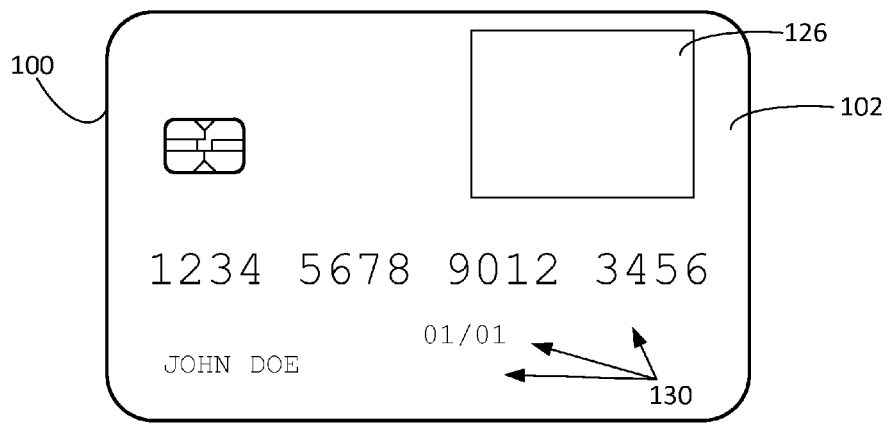
FIGS. 1a, 1b, and 1c illustrate various views of an embodiment of a payment device including an integrated energy source.
Figure 1B:
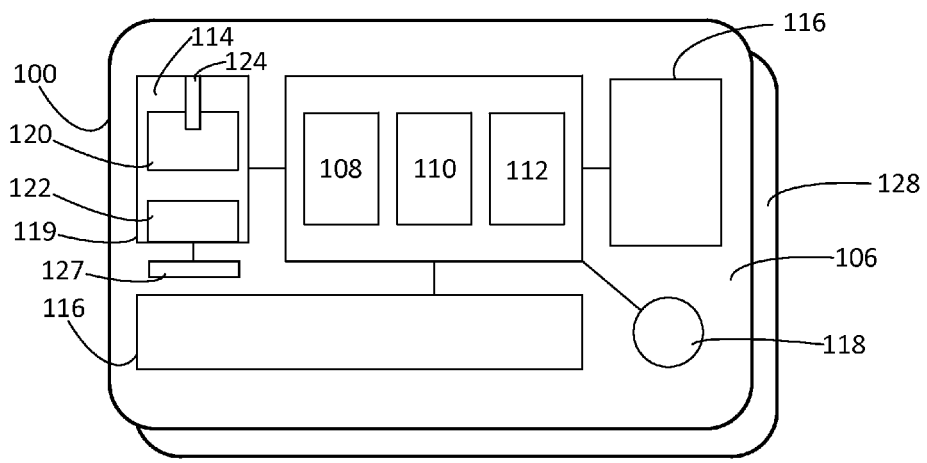
Figure 1C:
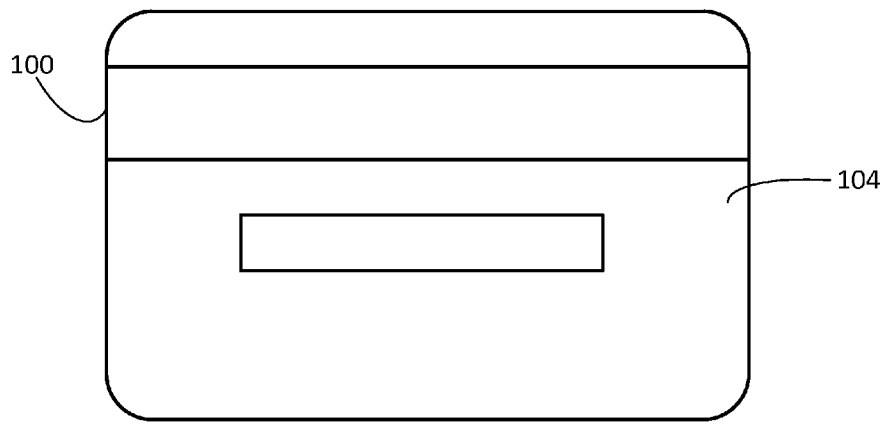

FIGS. 1a, 1b, and 1c generally illustrate a payment device 100. In particular, FIG. 1a illustrates a front outer view of the payment device 100, FIG. 1b illustrates a view of an inner layer of the payment device 100, and FIG. 1c illustrates a back outer view of payment device 100. The payment device 100 may take on a variety of shapes and forms. In some embodiments, the payment device 100 is a traditional card such as a debit card or credit card. In other embodiments, the card may be a fob on a key chain. As long as the payment device 100 may be able to communicate securely with a payment accepting device, the form of the payment device may not be especially critical and may be a design choice. For example, many legacy payment devices 100 may have to be read by a magnetic stripe reader and thus, the payment device 100 may have to be sized to fit through a magnetic card reader. In other examples, the payment device 100 may communicate through near field communication and the form of the payment device 100 may be virtually any form. Of course, other forms may be possible based on the use of the card, the type of reader being used, etc.

Physically, the payment device 100 may be a card and the card may have a plurality of layers to contain the various elements that make up the payment device 100 as illustrated in FIGS. 1a, 1b, and 1c. In one embodiment, the payment device 100 may have a substantially flat front surface 102 and a substantially flat back surface 104 opposite the front surface. Logically, in some embodiments, the faces 102, 104 may have some embossments. Further, an inner layer 106 may have openings for a processor 108, memory 110, input/output circuit 112, and power source 114. Some embodiments may also include a display 116 and input device 118 that may be part of the payment device 100. In some embodiments, the input device 118 may include a biometric sensor.

The power source 114 may include transducer such as, for example, a piezoelectric accelerometer including a housing body 119, a mass element 120, a piezoelectric material 122, an actuation means 124, and an energy storage device 126. The actuation means 124 may include any structure to facilitate motion of the mass 120 within the piezoelectric accelerometer. The motion of the mass 120 within the body 119 or pressure exerted by a user will exert a physical force on the piezoelectric material 122 as either bending or compressing the material 122. Compression force on the material 122 includes a force exerted to one side of the piezoelectric material 122 while the opposing side rests against a fixed surface, for example, and inner wall of the power source 114. Bending force may involve the mass 120 or other means exerting a force on the piezoelectric material 122 about an axis of the material 122. In some embodiments, the piezoelectric accelerometer includes a tri-axis accelerometer such as the KX112 or KXCJB as produced by Kionix, Inc., of Ithaca, N.Y. Of course, other types of piezoelectric accelerometers may be suitable for the power generation and other functions described herein.

The material 122 may include crystal and ceramic materials. Some embodiments may employ a single-crystal material 122 (e.g., quartz) while other embodiments may employ ceramic materials. Some embodiments of the piezoelectric accelerometer power source 114 may include barium titanate, lead-zirconate, lead-titanate, lead metaniobate, and other piezoelectric materials 122.

In use, motion of the payment device 100 to actuate the mass 120 against the piezoelectric material 122 or pressure by a user compressing a piezoelectric material of the card generates electrical energy. The energy created by the power source 114 may then be consumed by the processor 118, display 116, or other components of the payment device 100. Too, the energy may be stored for later use in a power storage element 127. In some embodiments, the power storage element is a rechargeable battery, capacitor, or other element capable of frequently receiving and storing electrical energy. Of course, the payment device 100 may also include circuitry or other means to transfer the generated energy from the power source 114 and/or the power storage element 127 to the processor 108, the display, or other components of the payment device 100.

In embodiments including a display 116, the substantially flat front surface 102 may include a translucent region 126 through which the display 116 may be viewed. Logically, a user may want to view the display 116. At the same time, the display may have to be protected from the elements. Thus a translucent region of either the top 102 layer and/or bottom layer 104 may be placed over the display 105. It also should be noted that there may be a plurality of displays 105, there may need to be room in the inner layer for each display and there may need to be translucent regions in the top and/or bottom layer to see the displays. Embodiments including the display 116 are further described by U.S. patent application Ser. No. 14/587,310 entitled "SELECTABLE DISPLAY OF DATA ON A PAYMENT DEVICE" the entire disclosure of which is entirely incorporated by reference herein.

The payment device 100 may also have a stiffness layer 128. Many circuits, processors, memories, displays, etc., may not be adapted to bend. In fact, many electronic devices break when the devices 100 are bent beyond a threshold. Thus, a stiffening layer 128 of non-flexible material may be added to the payment device 100. The stiffening layer 128 may be part of the front layer 102, back layer 104, inner layer 106 or the entire payment device 100 may be made of a stiff material.

Figure 2:
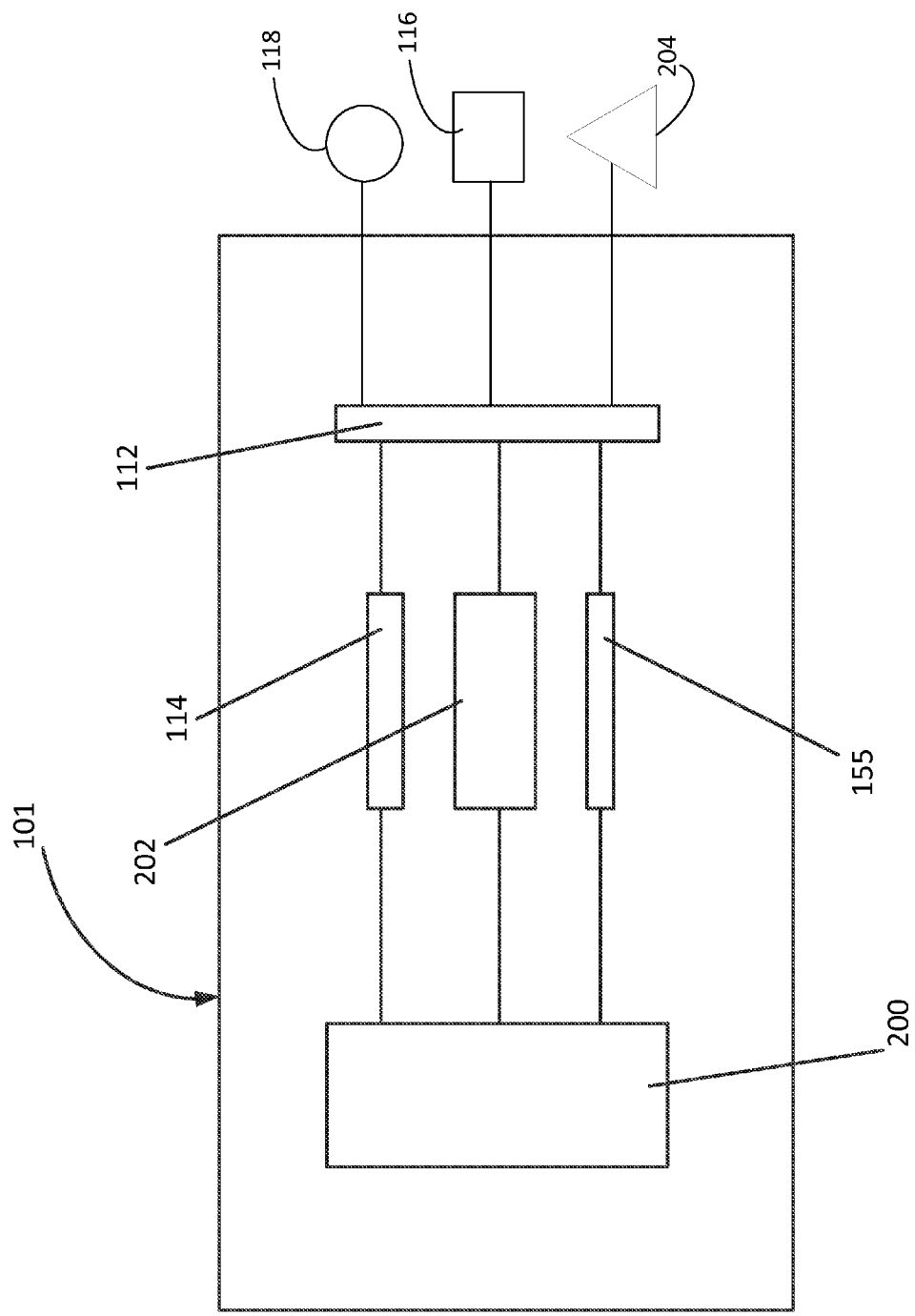
FIG. 2 is a view of a sample circuit design of the payment device with an integrated power source and various input devices.

Now referring to FIG. 2, the payment device may have a variety of components that make up the payment device 100. A processor 200 may be physically configured to enable the input 118 and display 116 along with the other computing elements. The processor 200 may be any processor that fits in the allotted space and can operate using the limited power in the payment device 100 and not generate excessive heat. The processor 200 may be adapted to turn off sections of the processor 200 when those sections are not needed. For example, the processor may turn off the display functions until an input is received from the input device 118 to save power from the power source 114.

The memory 202 may be any appropriate memory that fits in the space and can operate in the power environment of the payment device 100. The memory 202 may be physically configured to store steps or instructions that are executable by the processor 200 to enable the input device 118 and the display 116 and other functions as herein described. The memory 202 may be RAM or ROM, may be transitory or may be persistent depending on the needs of the specific embodiment of the payment device 100. The memory 202 may be physically part of or separate from the processor 200.

Similarly, the input/output circuit 112 may communicate signals to and from the processor 200 and it also may be part of the processor 200 or may be a separate device. In addition, the input/output circuit 112 may be required to fit in the space of the payment device 100 and may be required to operate in the power environment of the payment device 100.

Maintaining sufficient power in the power source 114 may be a concern as the display 116, input device 118, or other components of the device 100 may not operate if there is not enough power. In some embodiments, when power in the power source 114 or power storage element 127 falls below a threshold, a low power warning may be communicated. In some embodiments, the low power warning may be a message on the display 116, an email or a text message to a preset address, or an activated light indicator (e.g., an LED) on the device. Of course, communicating the low power message may also use power so the low power warning may only be communicated if the payment device 100 receives an acceptable communication signal above a threshold such that the message may be quickly communicated without requiring excessive re-sends or repeats. The message may be communicated via a transceiver 204 using, for example, Wi-Fi signals, cellular signals, near field communication systems or infrared signals. In embodiments using the piezoelectric accelerometer as the integrated power source 114, a user may "charge" the payment device 100 by moving or shaking the device until a sufficient charge is present to activate payment device functions. Since most users carry the payment device on their person, it is envisioned that typical daily movement such as walking, etc., will keep sufficient charge on the device 100. Too, the device may be charged or enter a powered or "wake up" state upon the natural motion of raising the card from a wallet or pocket during a payment transaction. Natural motions may be combined with other actions such as compressing a portion of the card, touching a heat sensor of the card, tapping the card against a surface, etc., to charge and/or wake up the payment device.

The input device 118 may also take on a variety of forms and be actuated in a variety of ways. Logically, the input device 118 may have to fit with the payment device 100 and may be in communication with the input/output circuit 112. In one embodiment, the input device 118 is a heat sensitive region on the payment device 100 and it may be actuated by warming the heat sensitive region. In another embodiment, the input device 118 is a touch sensitive region on the payment device 100 that is actuated by touching the touch sensitive region. In some embodiments, the input device 118 may be visible and in other embodiments, the input device 118 may be under a logo, such as from the payment device 100 issuer.

In another embodiment, input device 118 may be a motion sensor or coupled to a motion sensor such as the piezoelectric accelerometer of the integrated power source 114. Such an input device 118 may be actuated by flicking or clicking the payment device 100 which may cause a reading from the motion sensor to be beyond a threshold (e.g., a voltage generated by the piezoelectric accelerometer integrated power source 114). The threshold may be adjusted by a user as some user may be more active than other users. In some embodiments, a unique, user-defined pattern of taps with the device 100 against a surface may activate the device 100 for a period of time. For example, the integrated power source 114 piezoelectric accelerometer may register each tap and the processor 108 may execute instructions to verify the pattern to activate the payment device 100. Similarly, a movement pattern of the device 100 may also cause activation.

In yet another embodiment, the input device 118 may be an electronic signal and the input device 118 may be actuated by receiving an actuation signal from a trusted device. For example, the trusted device may be a portable computing device like a mobile phone, may be a payment device reader or an RFID device. In one embodiment, a user may communicate a signal from a mobile telephone to the transceiver 204 in the payment device 100 which may be received by the input device 118 and act as the input to actuate the display 118 or activate the payment device 100 itself such that payments may be made using the device 100. In some embodiments, the device activation may only persist for a short period of time (e.g., 15 seconds) such that a user may cause a payment to be processed using the device 100 and then the device may become locked or otherwise disabled until needed again. Logically, the message may be encrypted and may require an exchange of electronic keys to establish trust between the payment device 100 and the trusted computing device. In some embodiments, if the actuation signal is received from a non-trusted device more than a threshold number of times during a period, the device may become locked for an extended time or deactivated completely via a signal to the device 100 via the transceiver. By using an electronic signal as the input, the security of the payment device 100 may be increased.

In some embodiments, the input device 118 may be a biometric sensor adapted to detect human body characteristics of the user, such as fingerprints, eye retinas and irises, voice patterns, facial patterns, and hand measurements, for authentication purposes. For example, the input device 118 may be actuated by receiving a trusted fingerprint on the fingerprint reader. The memory 202 may include instructions that are executed by the processor 200 which verify the trusted fingerprint as received at the input device 118. By using a biometric sensor for the input device 118, the security of the payment device 100 may be increased.

In yet another embodiment, the input device 118 may be an image sensor. The input device 118 may be actuated by receiving an acceptable image which may be set up in advance by an approved user. The memory 202 may include instructions that are executed by the processor 200 to verify the image and transmit an approval signal. By using an image sensor, the security of the payment device 100 may be increased.

In other embodiments, the input device 118 may be a sound sensor such as a microphone. The input device 118 may be actuated by receiving an acceptable sound or voice which may be set up in advance by an approved user. A sound analysis module may be stored in the memory 202 and may include instructions that are executed by the processor 200 to receive sound and communicate an approval signal that may be received in response by the receiver 204. By using a sound sensor, the security of the payment device 100 may be increased.

The integrated power source 114 may facilitate many further security functions for the payment device 100 to restrict use of the device to authorized users. In use, a user may activate the payment device 100 in a variety of ways that do not require power from a point-of-sale device such as a traditional credit card reader. For example, motion of the payment device 100 may cause motion of the mass 120 within the piezoelectric accelerometer integrated power source 114 and cause it to deform (i.e., compress or bend) the piezoelectric material 122. Thus, any single motion or combination of various motions of the card may generate power that may be stored in the power storage element 127, used by the processor 108, used by the display 116, used by the input device 118, etc. Such motion may cause the card to be "unlocked" or authorized to transmit a signal to facilitate completing a payment using the payment device 100. For example, in some embodiments, a user may remove the payment device 100 from his or her wallet and flick or shake the card causing the piezoelectric integrated power source 114 to generate power which then causes the processor 108 to execute one or more instructions stored in the memory 110 to activate the display 116, input device 118, or other aspect of the payment device as herein described to facilitate a payment transaction using the payment device. In other embodiments, the payment device 100 may be activated using a plurality of different motions or a combination "passcode" motion. A user may configure the payment device 100 to activate upon a series of motions. Upon moving the card in the configured sequence of motions, the card may activate. For example, the piezoelectric accelerometer integrated power source 114 may detect various motions in one or more directional axes and one or more instructions stored in the memory 110 may be executed by the processor 108 to record a signature of the motions in the memory 110. The signature may be an amount of power or voltage produced by the piezoelectric accelerometer integrated power source 114 (e.g., the voltage exactly or substantially meeting or exceeding a threshold), an orientation of the power source 114, or any other measurable and repeatable metric that a user may cause a piezoelectric accelerometer to produce and may be recorded, as known in the art. In use, the user may set a passcode motion sequence of moving the card in a circular motion, back and forth vertically once, then back and forth horizontally twice. Upon executing that same sequence of motions, the device 100 may be temporarily activated to facilitate completing a payment transaction.

Of course, many other single movements or combinations of movements are possible and may be used as the passcode motion sequence. In some embodiments, activation of the payment device 100 may be caused by motion of the mass 120 within the piezoelectric accelerometer integrated power source 114 to deform the piezoelectric material 122 and generate a voltage coupled with another input to the input device 118. For example, the device 100 may be activated to facilitate a payment by the combination of a movement which translates to the piezoelectric accelerometer integrated power source 114 and input from the input device. A user may remove the device 100 from his or her wallet with his or her thumb or other digit placed on the input device 118. The combined motion of the mass element 120 within the piezoelectric accelerometer integrated power source 114 and pressure on the input device 118 may cause the processor 108 to execute one or more instructions from the memory 110 to activate the device 100 and facilitate the payment transaction. Where the input device 118 is a biometric sensor, the device 118 may read a biometric input (e.g., finger print or other biometric as known in the art and described herein) at the device 118 and use that as input for the combination of motions to activate the payment device 100.

Other security and ease-of-use functions that may be facilitated by an integrated power source 114 such as a piezoelectric accelerometer may include allowing the device 100 to facilitate payment only when energized and unlocked by the user, increasing a range of devices 100 employing wireless communication elements (e.g., Bluetooth, RFID, Wi-Fi, etc.), and allowing for on-device generation of security tokens, displays, and dynamic authorization data without requiring an on-card battery.

If the input device 110 is activated, a variety of steps or events might happen. In one embodiment, a portion of the payment device 100 may illuminate such as a logo or the input device 110 itself may illuminate. In addition, the display 105 may display the desired sensitive data 130 (FIG. 1a) when the input device 110 is actuated. The sensitive data 130 may be virtually any data needed to complete a payment transaction such as ccv, expiration date, card number, user name, and issuer.

In some embodiments, actuating the input device 118 may cause the sensitive data 130 to be displayed in a rotating manner through the display 116. For example, a single input (e.g., motion of the mass within the body of the piezoelectric accelerometer integrated power source 114) may cause the account number to be displayed, an additional input (e.g., pressure or a biometric reading of the input device 118) may cause the expiration date to be displayed and yet another input (e.g., a pattern of motions, combinations of inputs, etc.) may cause the expiration to be displayed.

In yet some more embodiments, the payment device 100 may include a plurality of displays 116 placed in the payment device 100. A single input may cause the sensitive data 130 to appear in any of the displays 116. In yet another embodiment, the input device 118 may be actuated to display the desired sensitive data 130 in a rotating manner through the displays 116. In other embodiments, the sensitive data 130 may be displayed randomly in the various displays 116.

Logically, the display of sensitive data 130 on the display 116 may only be for a given period of time. The integrated power source 114 may have a limited life so it may be logical to limit the length of the display. Further, the limited length may make it more difficult for the sensitive data 130 to be stolen. In some embodiments, the length of time for a display 116 to display the sensitive data 130 may have a default value and may be further adjusted by a user.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A payment device comprising:
   an integrated power source including a piezoelectric accelerometer;
   a processor in communication with the integrated power source;
   an input/output circuit in communication with the processor; and
   a memory in communication with the processor, the memory storing instructions that, upon execution by the processor:
      activate payment functions of the payment device upon receipt of a first input by the processor from the input/output circuit,
      deactivate the payment functions of the payment device after a threshold amount of time without receiving a second input by the processor from the input/output circuit,
      determine a pattern of kinetic energy translation to the integrated power source,
      determine the pattern matches a passcode motion stored in the memory, and
      activate the payment device in response to the pattern matching the passcode motion;
   wherein kinetic energy translation to the integrated power source powers the processor, memory, and input/output circuit, and causes the processor to execute the instructions, the input/output circuit comprises a heat sensitive region on the payment device, and the memory stores further instructions that, upon execution by the processor:
      receive warming input from the input/output circuit via the heat sensitive region,
      activate payment functions of the payment device upon receiving the warming input, and
      translate kinetic energy to the integrated power source to determine that the input/output circuit has been actuated.

2. The payment device of claim 1, further comprising an electronic display in communication with the input/output circuit, wherein the electronic display only displays sensitive data in response to the kinetic energy translation to a mass of the piezoelectric accelerometer, and the sensitive data includes data to complete a payment transaction.

3. The payment device of claim 1, wherein the payment device comprises a plurality of layers comprising:
   a substantially flat front surface;
   a substantially flat back surface opposite the front surface; and
   an inner region comprising openings for the processor, memory and integrated power source.

4. The payment device of claim 1, wherein the kinetic energy translation is first translated from the payment device and then either to one or more of:
   a mass element of the piezoelectric accelerometer, and
   a piezoelectric material of the piezoelectric accelerometer to compress a piezoelectric material of the piezoelectric accelerometer and cause the integrated power source to power the processor, memory, and input/output circuit and activate the payment functions of the payment device.

5. The payment device of claim 1, wherein the input/output circuit comprises a biometric sensor on the payment device, and wherein the processor is configured to detect one or more biometrics of a user to determine that the input/output circuit is actuated.

6. The payment device of claim 5, wherein the processor is further configured to detect translation of kinetic energy to the mass of the piezoelectric accelerometer in combination with input from the input/output circuit.

7. The payment device of claim 6, wherein the determination that the input/output circuit is activated includes detection of one or more biometrics of the user.

8. The payment device of claim 7, wherein the one or more biometrics includes a fingerprint.

9. The payment device of claim 8, wherein the pattern includes one or more of a tapping pattern and a motion pattern.

10. The payment device of claim 9, wherein the motion pattern includes one or more of a circular motion, a back-and-forth horizontal motion, and a back-and-forth vertical motion.

11. The payment device of claim 1, wherein the integrated power source includes a mass element, a piezoelectric material, and an actuation means within a housing body, and an energy storage device.

12. The payment device of claim 11, wherein the actuation means includes a structure to facilitate motion of the mass within the housing body to exert a physical force on the piezoelectric material.

13. The payment device of claim 12, wherein the physical force includes a compression force or a bending force.

14. The payment device of claim 13, wherein the piezoelectric material is selected from the group consisting of barium titanate, lead-zirconate, lead-titanate, and lead metaniobate.

15. The payment device of claim 14, wherein the integrated power source further includes a power storage element.

16. The payment device of claim 1, wherein the processor is further configured to generate one or more security tokens in response to activation of the payment functions of the payment device.

17. The payment device of claim 1, wherein the processor is further configured to generate dynamic authorization data in response to activation of the payment functions of the payment device.

* * * * *